United States Patent
Andresen et al.

(10) Patent No.: US 7,189,921 B2
(45) Date of Patent: Mar. 13, 2007

(54) HOUSING ARRANGEMENT WITH AT LEAST TWO JUNCTION BOXES

(75) Inventors: Jens Andresen, Blomberg (DE); Ralf Lange, Horn-Bad Meinberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 11/243,184

(22) Filed: Oct. 5, 2005

(65) Prior Publication Data

US 2006/0086521 A1 Apr. 27, 2006

(30) Foreign Application Priority Data

Oct. 5, 2004 (DE) .................... 10 2004 048 770

(51) Int. Cl.
*H02G 3/08* (2006.01)
(52) U.S. Cl. ................. 174/50; 174/520; 174/559; 220/3.2; 220/4.02; 439/535; 439/76.2
(58) Field of Classification Search ........... 174/50, 174/53, 57, 58, 17 R, 52.1, 559, 520, 481; 220/3.2, 3.3, 3.4, 3.5, 3.6, 3.7, 3.8, 3.9, 4.02, 220/4.26, 4.27; 248/906; 361/600, 601; 439/535, 536, 76.1, 76.2, 701, 717, 594, 439/638

See application file for complete search history.

(56) References Cited

U.S. PATENT DOCUMENTS

| 4,220,391 | A | * | 9/1980 | Krolak et al. | ............... 439/638 |
| 6,069,315 | A | * | 5/2000 | Tang | ............................ 174/50 |
| 6,083,011 | A | * | 7/2000 | Daoud | ......................... 439/49 |
| 6,191,358 | B1 | * | 2/2001 | Daoud | ......................... 174/50 |
| 6,321,925 | B1 | * | 11/2001 | Crouse et al. | ............. 220/4.27 |
| 6,797,878 | B1 | * | 9/2004 | Radelet | ....................... 174/50 |

FOREIGN PATENT DOCUMENTS

DE  43 20 261 A1  12/1994

* cited by examiner

*Primary Examiner*—Angel R. Estrada
(74) *Attorney, Agent, or Firm*—David S. Safran

(57) ABSTRACT

A housing arrangement with at least two junction boxes, a base part and a cover, the junction boxes each having a square housing with a terminal strip for electrical connection of an electric cable or a line, and at least two openings for electric cables or lines. The housing arrangement can be modularly built and variably adapted to different requirements since the individual junction boxes can be mounted on top of one another turned by 0°, 90°, 180° or 270° relative to one another. The terminal strips are connectors which can be mounted in a junction box in any of four positions which are turned by 90° relative to one another, and the connectors of two junction boxes which are mounted on top of one another can be connected to one another with the plug part of one connector can be inserted into the socket part of the other connector.

25 Claims, 7 Drawing Sheets

HOUSING ARRANGEMENT WITH AT LEAST TWO JUNCTION BOXES

BACKGROUND OF THE INVENTION

1. Field of the Invention

The invention relates to a housing arrangement with at least two junction boxes, a base part and a cover, the junction boxes each having a square housing, in the housings there being a terminal strip which has at least one terminal for electrical connection of an electric cable or a line, and the housings having at least one opening each for electric cables or lines. In addition, the invention relates to a junction box with a square housing, with a terminal strip which has at least one terminal for electrical connection of an electric cable or a line, the housing having at least one opening for electric cables or lines.

2. Description of Related Art

Junction boxes which are often also called wiring boxes, outlet boxes, or cable boxes are known in manifold versions. If it is a matter of connecting a cable to an electrical device or a machine, the box is called an outlet box. If two cables or lines are to be connected to one another, the box is called a junction box. Generally the outlet box and the junction box are made essentially identically so that a junction box is always addressed below.

These boxes generally consist of a bottom part and a cover which can be screwed onto the bottom part. The known boxes have a different cross sectional configuration, and in their interior the terminals for electrical connection of an electric cable or a line are arranged directly differently. Generally, instead of individual terminals, continuous terminal strips are used which have several terminals. German Patent Application DE 43 20 261 A1 discloses attaching the terminals to the floor of the bottom part of the housing. The terminals can be fixed on the floor of the box by additional fasteners, for example, by screws. In addition, the molding of projections onto which the terminals can be slipped on the floor is also known.

The core of an electric cable can be connected to each terminal. Instead of electric cables which are used for transmission of current, therefore which supply a system or machine with the necessary operating current or the necessary operating voltage, electric lines which are used primarily or in addition to transmit electrical signals, i.e., for data transmission, can also be connected to the junction boxes. This is the case for example, in so-called sensor-actuator systems. The junction boxes are thus used as mechanical protection for the terminals which are located in the interior and as electrical protection for the electrical connection which is established on the terminals between the different cables or lines. The housing of the junction boxes therefore generally consists of a plastic which satisfies the respective requirements, with a corresponding safety class, for example, IP 66 or higher.

These junction boxes are often located together in a plurality in control cabinets, the bottom parts often having attachment possibilities, for example, hooks or holes, for attachment of the junction boxes to a mounting rail or to a mounting wall. To connect the individual junction boxes to one another, bottom parts are known which have hooks on their side walls so that several junction boxes can be connected to one another to form a housing arrangement, the individual junction boxes being located in one plane next to one another and on top of one another. But the disadvantage here is that by connecting the individual junction boxes to one another the alignment of the openings which are made in the individual junction boxes for the incoming and outgoing electric cables is fixed. This housing arrangement thus cannot be used for different applications in which the incoming and the outgoing cables or lines come from different directions which are not established beforehand.

SUMMARY OF THE INVENTION

Therefore, a primary object of the invention is to provide a housing arrangement of the initially described type with at least two junction boxes which enables the user to build the housing arrangement modularly and to variably adapt it to different requirements, especially with respect to the direction of the incoming and outgoing cables or lines. In this case it will be possible to economically produce the junction boxes.

This object is achieved in the initially described housing arrangement in that the individual junction boxes can be mounted on top of one another turned by 0°, 90°, 180° or 270° relative to one another, that the terminal strips are made as connectors with a plug part and a socket part, that the connector can be mounted in any junction box selectively in four positions which are turned by 90° at a time to one another, and that the connectors of two junction boxes which are mounted on top of one another can be connected to one another such that the plug part of one connector can be inserted into the socket part of the other connector.

Because the individual junction boxes can be mounted on one another turned selectively by 0°, 90°, 180° or 270° to one another, it has become possible first of all to optimally align the individual junction boxes with the openings located in the housings each to the direction of the incoming or outgoing cables or lines. The housing arrangement according to the invention thus represents a modularly buildable power distribution board in which the required number of junction boxes can be mounted on top of one another according to a tower. In order be able to implement the electrical connection between the individual junction boxes, i.e., between the individual terminal strips, as easily as possible, especially without additional wiring effort, the individual terminal strips are made as connectors with a plug part and a socket part. The electrical connection between the individual connectors and thus also between the electrical cables which are each connected to the connectors thus takes place easily in that the plug part of the one connector, the upper one, is inserted into the socket part of the other connector, the lower one, when two junction boxes are being mounted on top of one another.

The cascadable connection of the individual connectors among one another makes it necessary for the individual connectors to each be aligned to one another, i.e., to be located on top of one another. But since it is to be possible to mount the individual junction boxes on top of one another turned selectively by 0°, 90°, 180° or 270°, four different junction boxes would be necessary in which the connector is mounted in the housing in four positions turned by 90° at a time to one another. To avoid such a diversity of types and also to still be flexible on site with respect to the alignment of the individual junction boxes, it is provided according to the invention that the connector in each junction box can be mounted in four positions turned by 90° at a time to one another. The connector is thus not permanently connected to the junction box from the start, but it is possible to mount the connector selectively in one of four positions in the housing when the housing arrangement is being assembled according to the alignment of the individual junction boxes.

Preferably, it is provided here that there are bars in the area of the corners within the housing of the junction boxes, and on the end of the connectors, there are the corresponding guide grooves so that the connector with the guide grooves can be slipped onto the bars in the housing. This enables simple mounting of the connector in the housing of the mounting box without tools. Of course, it is also possible to arrange the corresponding bars on the ends of the connectors and the corresponding guide grooves in the housing of the junction boxes. Likewise, there can be a catch arm on the connector and the corresponding catch openings in the housing, or catch openings in the connector and the corresponding catch arm on the housing.

According to a second teaching of the invention which is preferably implemented together with the above described first teaching of the invention, but which can also be implemented independently of it, the above described housing arrangement can be especially easily built in a modular manner in that the individual junction boxes can be mounted on top of one another, that on the housing of each junction box there is at least one locking element with a pivoting capacity such that it can be moved out of a first, i.e., open position into a second, i.e., locking position, and that in the area of the corners outside on the housing of each junction box projecting ribs are formed, the locking element being bent essentially in a U-shape and having one U-bridge which is used as an actuating clip and two U-legs, with ends which each have one recess, the two recesses in the second position, i.e., the locking position, each extending around one rib at a time on one corner of the housing of a second junction box.

The modular structure of the housing arrangement according to the invention is also ensured first of all in the second teaching of the invention in that the individual junction boxes can be mounted on top of one another. In order to easily but reliably attach the junction boxes to one another, on the housing of each junction box at least one locking element is arranged with a pivoting capacity, and the locking element can be moved out of a first, i.e., open position, into a second, i.e., locking position.

The locking element is thus bent essentially in a U-shape so that it can extend around one side of the housing of the junction box, by which the outside dimensions of the junction box are made only insignificantly larger. In addition to the U-bridge which is used as the actuating clip, the locking element has two U-legs with one recess each made in their end, which recess is used for locking to the housing of a second junction box. To do this, in the area of the corners outside on the housing of each junction box projecting ribs are formed which in the second locking position are clasped by the recesses in the U-legs of the actuating clip of another junction box. To mount two junction boxes on top of one another, the locking element of one junction box thus interacts with the ribs of the other junction box which are made on the housing, and the recesses formed in the U-legs can be easily caused to engage the ribs on the housing by the pivoting arrangement of the locking element.

According to one preferred embodiment, on each junction box, there are two locking elements on two opposing sides of the housing, by which reliable attachment of the individual junction boxes to one another is ensured. Advantageously, a depression is formed in the recesses in the ends of the U-legs of the locking elements and on the end of the ribs on the housing a thickened area is formed so that the thickened area on the ribs in the second position, i.e., the locking position, locks into the depression in the recess. In this way, locking which prevents unintentional unlocking when the depression and thickened area are dimensioned accordingly is easily implemented.

The pivoting support of the locking element, which is preferably made of metal, on the housing of the junction box according to one preferred configuration takes place by a hole being formed in each of the U-legs of the locking element and by there being two pins corresponding thereto on the two opposing sides of the housing, the locking element with the holes being capable of being locked onto the pins so that the pins form the axis of rotation for the locking element. The pins are preferably integrally connected to the housing. In addition, it is also fundamentally possible to make corresponding holes on two opposing sides of the housing, which holes the pins which are located on the U-legs of the locking element can then engage.

According to another, especially advantageous configuration of the second teaching of the invention, on the U-legs of the locking element an elastic catch arm is formed with the end in the first, i.e., open position adjoining the edge which is formed on the housing of the junction box, so that the locking element is kept in the first, i.e., open position. This ensures that when the housing arrangement is installed the locking element does not unintentionally travel into the second, locking position, by which first of all the installation of two junction boxes with one another would be prevented. If the two junction boxes are located on top of one another in the desired orientation, when the locking element is intentionally actuated the catch arm as a result of its elastic property is released from its locking position so that the locking element can be pivoted into the second, locking position.

Here, it is provided preferably that, in the second position, i.e., the locking position, the elastic catch arm is relieved again, the bead-like end of the catch arm then adjoining the second edge on the housing of the junction box, so that the locking element is also held by the elastic catch arm in the second position, i.e., the locking position.

It was stated at the beginning that the housing arrangement has at least two junction boxes, one base part and one cover part. Only one cover and one base part are necessary for the entire housing arrangement due to the arrangement of the individual junction boxes on top of one another according to the invention. Preferably the cover and the base part are separate components so that the individual junction boxes can be made identical. The housings of the individual junction boxes are then made frame-like so that they are open at the top and bottom.

However, basically, it is also possible to make the base part or the cover integral with the housing of the junction box. If the base part is made as a separate component, according to one preferred configuration of the second teaching of the invention on the base part in the area of the corners ribs are formed which project to the outside and which can engage the recess in the ends of the U-legs of the locking elements. In this way one junction box can be mounted both on another junction box and also on the base part. The base part itself preferably has a peripheral edge in which there are holes through which the base part can be mounted in a control cabinet or on a machine housing by means of screws. Moreover, the base part can also have at least one opening for an electric cable or a line.

As was already mentioned at the beginning, this invention relates not only to a housing arrangement with at least two junction boxes, one base part and one cover, but also to an individual junction box with a square housing and with at least one terminal strip for electrical connection of an electric cable or a line, the housing having at least one opening for electrical cables or lines. The junction box according to the invention which is especially suitable for used in the above described housing arrangement is first of all essentially characterized in that the terminal strip is made as a connector with a plug part and a socket part and that the connector can be mounted in the housing selectively in four positions which are turned by 90° at a time.

As has already been stated in conjunction with the housing arrangement according to the invention according to the first teaching of the invention, by making the terminal strip as a connector with a plug part and a socket part, especially simple connection of the connector of the junction box to the connector of a second junction box is possible without the need for wiring of the individual terminals of the terminal strips among one another. Because the connector is not located fixed in the housing, but can be mounted selectively in one of four positions in the housing, not only was there optimum matching of the junction box to the respective conditions of use, especially to the direction of an incoming or outgoing cable, but moreover it was also possible to connect the individual cores of the electric cable which is to be connected first of all to the individual terminals of the connector, and only afterwards to mount the connector in the housing. In particular, for junction boxes with relatively small dimensions, in this way, the connection of an electric cable to the connector and thus also the junction box is greatly facilitated.

The terminals of the connector are preferably made as screw force terminals or spring force terminals. Both types of connection have proven themselves in practice millions of times and even for small dimensions of the junction box and thus also of the connector guarantee simple and reliable contact-making of the individual cores of an electric cable which is to be connected. Moreover, it is also fundamentally possible to make the terminals of the connectors in insulation piercing connecting technology.

In order to further increase the different possible applications of the junction box according to the invention, the housing preferably has two openings for electric cables or lines which are made in two opposing side walls of the housing. This makes it possible to connect not only an incoming or an outgoing cable, but moreover also a continuous cable to the junction box. Such a junction box can also be used as a so-called T-distributor. The continuous cable which is inserted through one opening into the housing and which is routed out of the housing through the other opening, is then connected within the housing with its individual cores to the individual terminals of the connector.

According to another advantageous embodiment of the junction box according to the invention, there is a U-shaped metal part, on the back of the metal part there being at least one connecting bar which can be connected to one terminal of the connector. Such a metal part can be provided for example, as grounding metal, then the connecting bar being inserted into the terminal of the connector, which terminal is connected to the core of the cable which is to be connected, which core carries the ground potential. In addition it is however also possible to provide several connecting bars on the metal part so that the metal part can be used for bridging individual terminals. For simple attachment of the metal part in the housing, in the metal part, preferably on the two corners, one hole each is made for insertion of a screw. In this way the metal part can be easily screwed tightly into the housing, for which preferably in the corners of the housing there are domes which are made as hollow domes and which have internal threads for screwing in the screws.

As has already been stated in conjunction with the housing arrangement according to the invention according to the second teaching of the invention, on the housing according to one preferred configuration there is at least one locking element with a pivoting capacity, using which element the housing can be locked to the housing of a second junction box or to a base part. With respect to the special configuration of the locking element, reference is made to the previous details in conjunction with the housing arrangement and to the following description of one preferred embodiment.

In particular, there are numerous possibilities for embodying and developing the housing arrangement and junction of the invention. In this regard, reference is made to the following detailed description of a preferred embodiment in conjunction with the accompanying drawings.

DETAILED DESCRIPTION OF THE INVENTION

Figure 1:
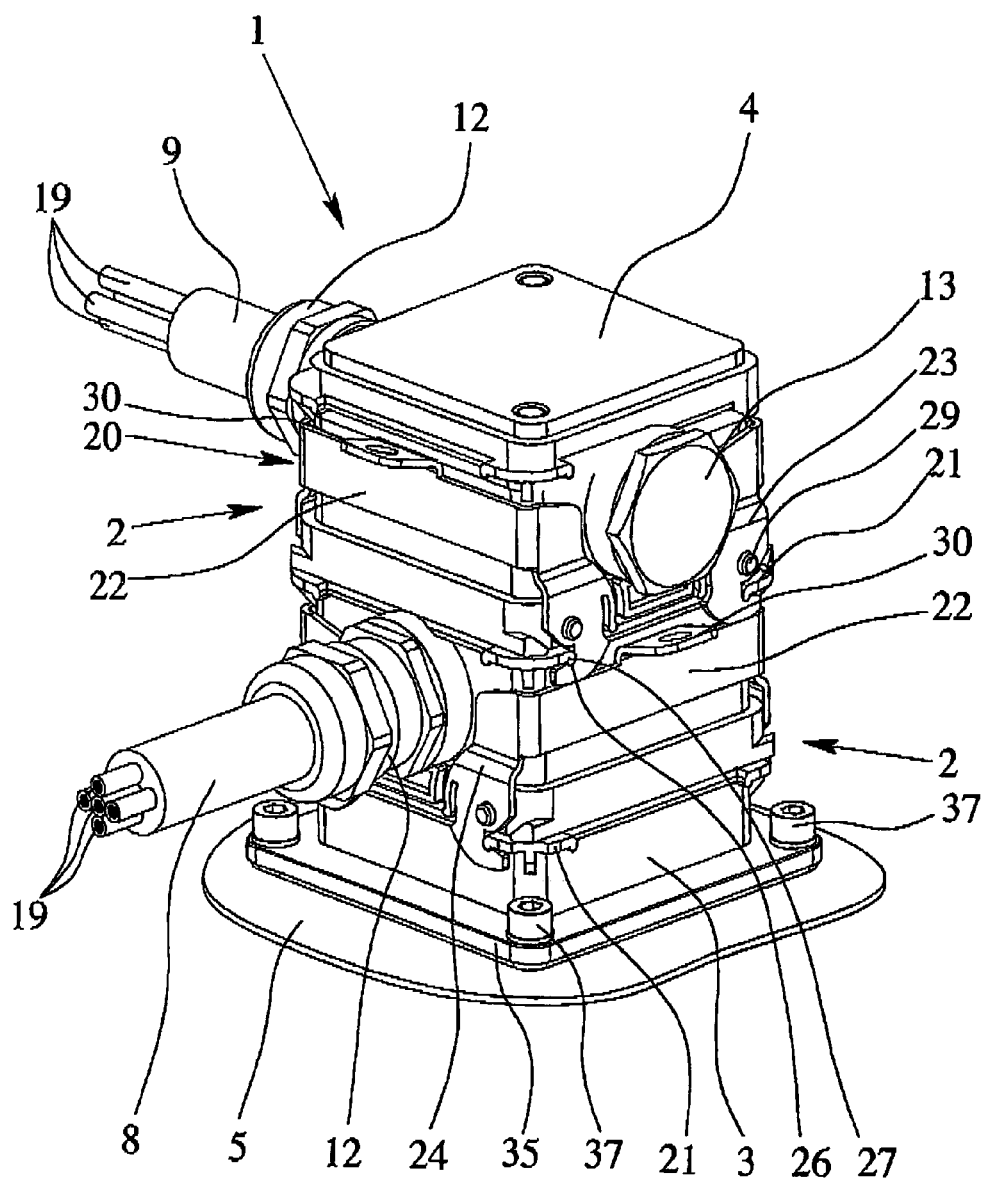
FIG. 1 is a perspective view of a housing arrangement in accordance with the invention with two junction boxes, a base part and a cover, in the installed state.
Figure 2:
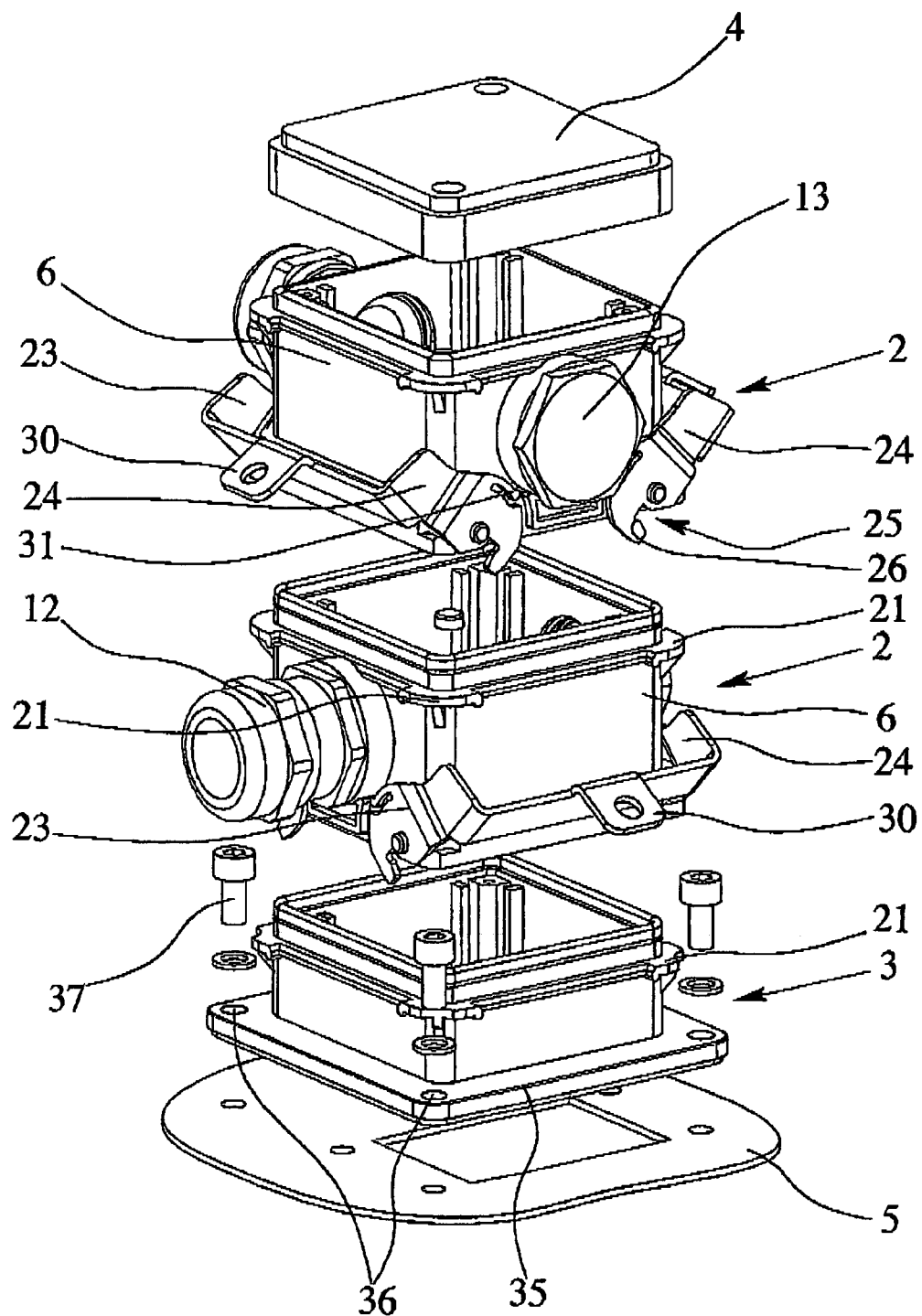
FIG. 2 is an exploded perspective view of the housing arrangement as shown in FIG. 1.

FIGS. 1 & 2 show a housing arrangement 1 with two junction boxes 2, a base part 3 and a cover 4. The housing arrangement 1 is attached by way of the base part 3 to a machine housing 5 which is shown here only by way of an extract. The two junction boxes 2 each have a square housing 6 in which there is a terminal strip which has several terminals 7 for connection of an electric cable 8, 9. For this reason, on two opposing sides of the housing 6 a respective opening 10, 11 is formed, in the illustrated exemplary embodiment only in one opening 10 of the housing 6 a respective cable 8, 9 connected to the junction box 2 using a cable union 12, while the second opening 11 is sealed with a filler plug 13. The two cables 8, 9 are guided to the two junction boxes 2 from two directions that are 90° apart so that the two junction boxes 2 are also arranged turned 90° with respect to one another.

Figure 3:
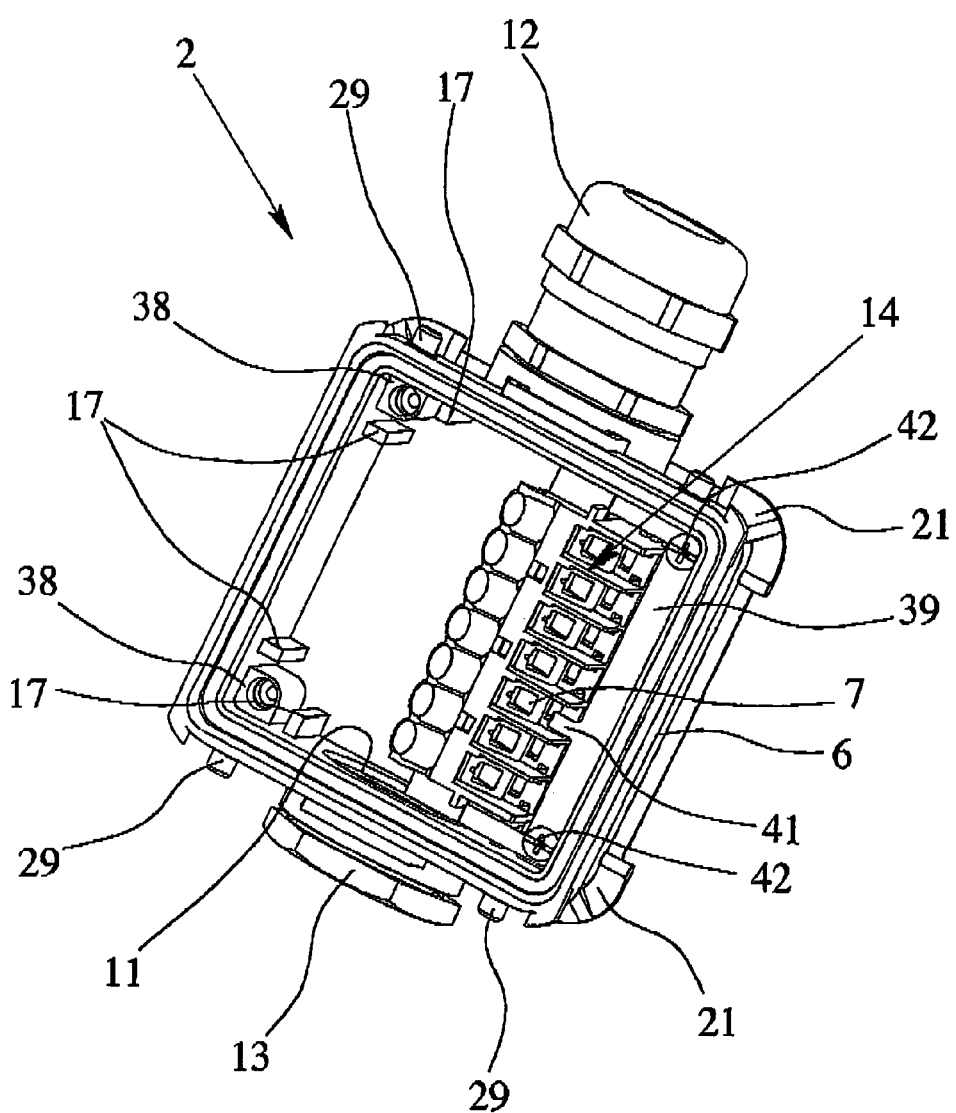
FIG. 3 is a bottom perspective view of a junction box according to the invention.
Figure 4:
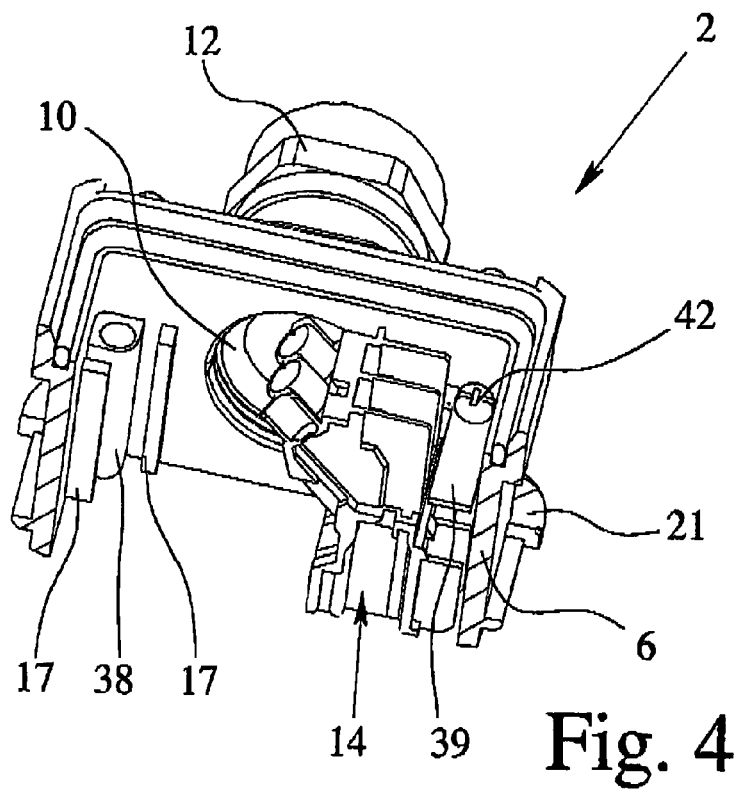
FIG. 4 is a bottom perspective view of the junction box as shown in FIG. 3.
Figure 5:
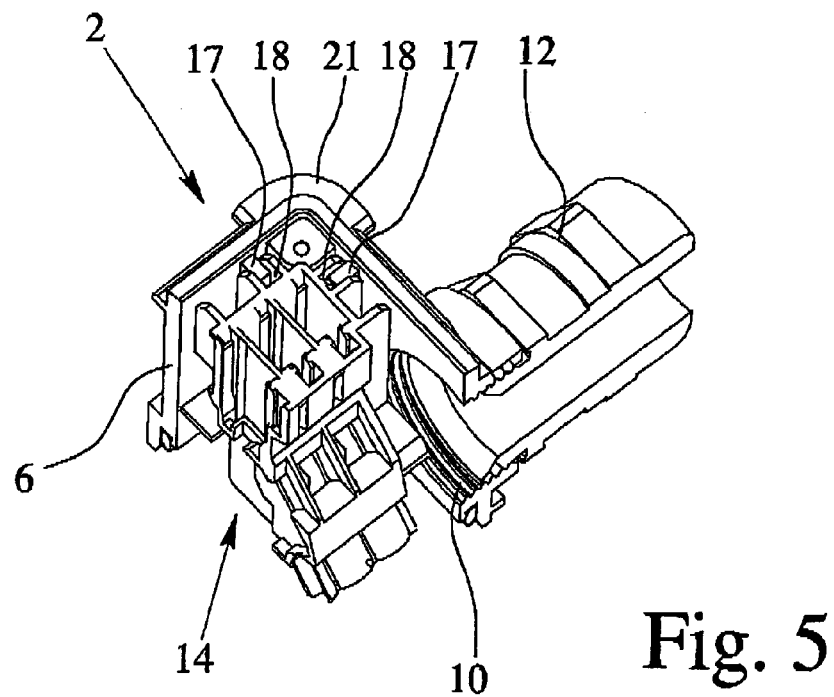
FIG. 5 shows top perspective view of the junction box as shown in FIG. 1.
Figures 6A, 6B:
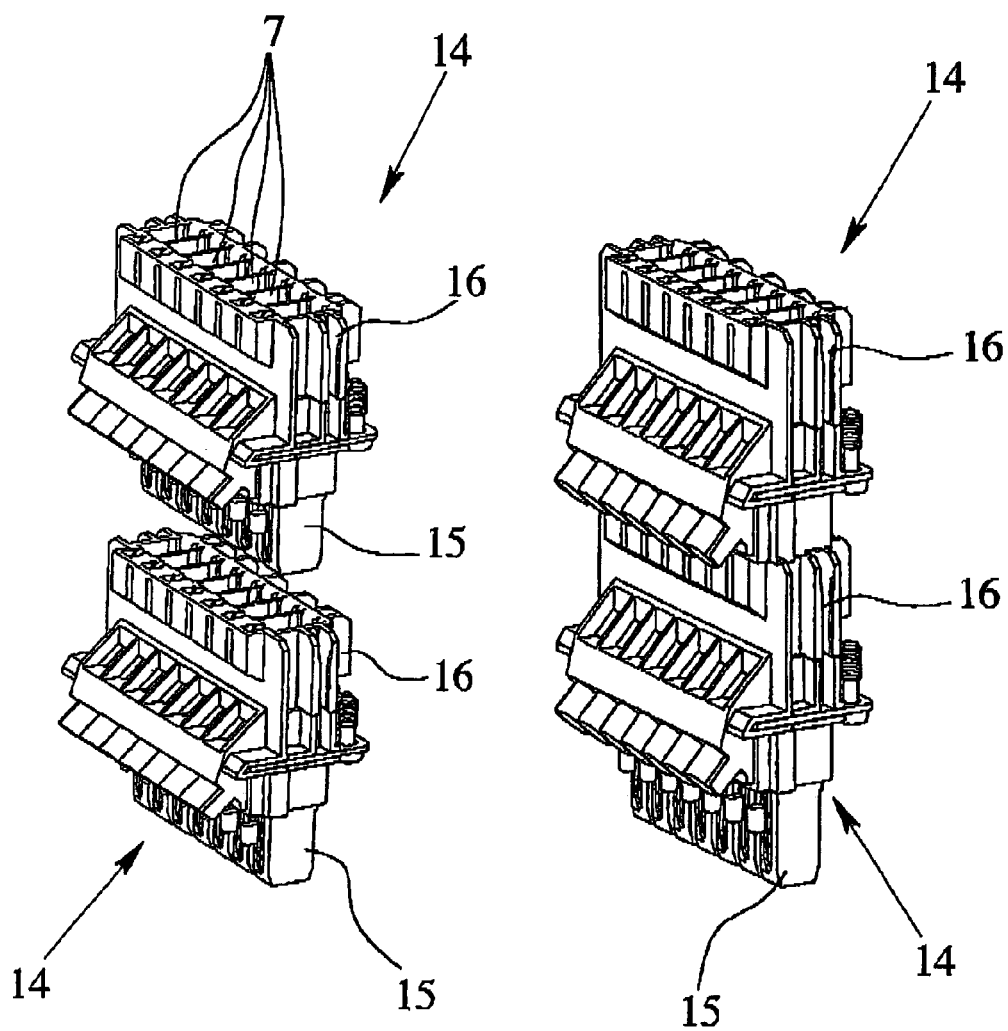
FIGS. 6a & 6b shows two connectors of two junction boxes according to the invention, FIG. 6a showing the unassembled state and FIG. 6b showing the assembled state.

As is especially apparent from FIGS. 3 & 6, the terminal strips are made as connectors 14 each of which have a plug part 15 and a socket part 16. To mount the connector 14 in the housing 6 of the junction box 2, bars 17 are formed in the area of the corners within the housing 6, and on the ends of the connector 14, corresponding guide grooves 18 are formed. The cylindrical base shape of the housing 6 and the arrangement of the bars 17 in all four corners of the housing 6 make it possible to mount the connectors 14 in the housing 6 selectively in any one of four positions which are turned 0°, 90°, 180°, and 270° relative to one another.

In the housing arrangement shown in FIG. 1, the first, lower junction box 2 and the second, upper junction box 2 are located turned by 90° on top of one another. Because it is possible to mount the connectors 14 in the housing 6 selectively in four positions which are turned 90° at a time relative to one another, two connectors 14 of two junction boxes 2 which are located on top of one another can be connected to one another, i.e., can be inserted into one another, regardless of how the two junction boxes 2 are aligned to one another, i.e., whether the two junction boxes are turned by 0°, 90°, 180°, or 270° relative to one another. This makes possible a modularly structured, easily cascadable power distribution board in which the openings 10, 11 in the individual junction boxes 2 are aligned according to the direction of the incoming and outgoing cables 8, 9.

Because the connectors 14 are not arranged fixed in advance in the housing 6 of the junction boxes 2, it is possible to connect the individual cores 19 of a cable 8, 9 which is to be connected, first of all, to the individual terminals 7 of the connector 14, and only afterwards to insert the connector 14 into the housing 6. In doing so, then the cable 8, 9 which is already connected to the connector 14 is routed from the inside out of the housing 6 through the opening 10 to the outside. Then, the first, lower junction box 2 is seated on the base part 3, and then, the second, upper junction box 2 can be seated on the lower junction box 2. Here, the plug part 15 of the connector 14 of the upper junction box 2 is inserted into the socket part 16 of the connector 14 of the lower junction box 2, by which the two connectors 14 are mechanically and electrically connected to one another.

To mount the individual junction boxes 2 on top of one another and to mount a junction box 2 on the base part 3, on the housing 6 of each junction box 2 two locking elements 20 are arranged to be pivotable, and projecting ribs 21 are made on the outside of the housing 6 in the area of the corners. The locking element 20 which can be pivoted out of a first, i.e., the open, position into the second position, i.e., the locking position, is made essentially U-shaped, the locking element 20 having a U-bridge 22 which is used as an actuating clip and two U-legs 23, 24 with a respective recess 25 formed in their ends. The interlocking of two junction boxes 2 to one another takes place in that after the two junction boxes 2 have been placed on one another the locking element 20 is pivoted out of the first, i.e., the open position into the second position, i.e., the locking position, in which the ribs 21 which are made on the first, lower housing 6 are encompassed by the recesses 25 which are made in the ends of the U-legs 23, 24. By forming recesses 25 which are open on one side in the ends of the U-legs 23, 24, the ends of the U-legs 23, 24 can also be called hook-shaped, the ends of the U-legs 23, 24 in the second position, i.e., the locking position, extending under the ribs 21.

In the same manner as on the housings 6 of the junction boxes 2, projecting ribs 21 are formed on the outside of the base part 3 in the area of the corners so that each junction box 2 can be mounted either on the base part 3 or on another junction box 2 by means of the locking element 20.

In order to prevent the locking element 20 from unintentionally pivoting back out of the second position, i.e., the locking position, in the recesses 25 one depression 26 is formed and on the end of the ribs 21 a thickened area 27 is formed. In this way the ribs 21 with their ends can engage the recesses 25 in the second position, i.e., the locking position. The U-shaped locking element 20 is thus supported to be able to swivel on the housing 6 by one hole 28 being formed in each of the two U-legs 23, 24 and corresponding thereto on the two opposing sides of the housing 6 there being two pins 29 which form the axis of rotation for the locking element 20. For easier actuation of the locking element 20 which closely adjoins the housing 6 in the second position, a grip section 30 is bent down on its U-bridge 22.

Figure 7A:
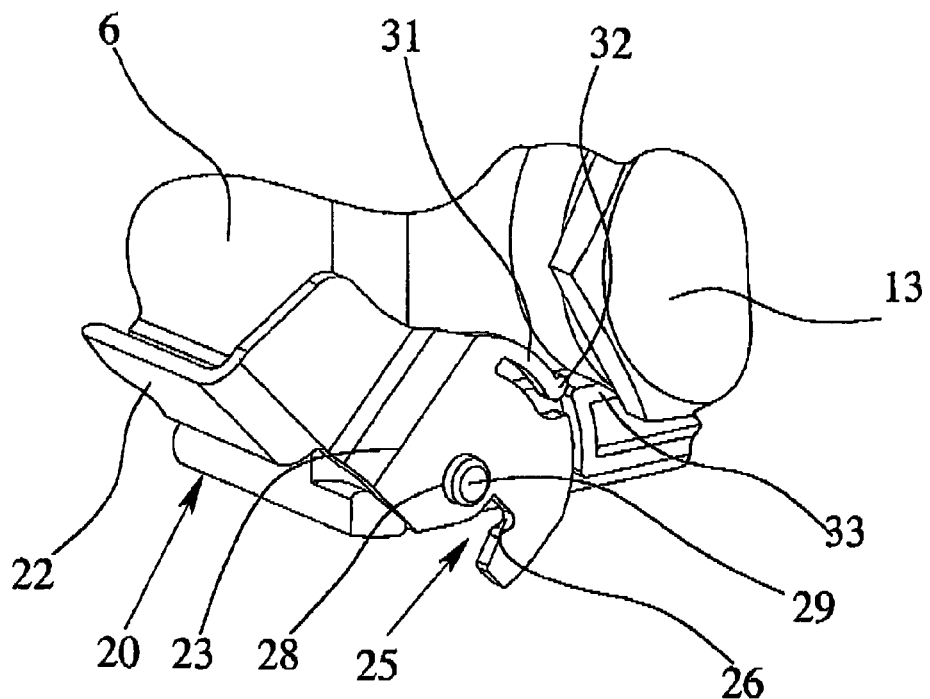
FIGS. 7a & 7b are enlarged views of a portion of a junction box according to the invention with a locking element in the first, open position (FIG. 7a) and in the second, locking position (FIG. 7b)
Figure 7B:
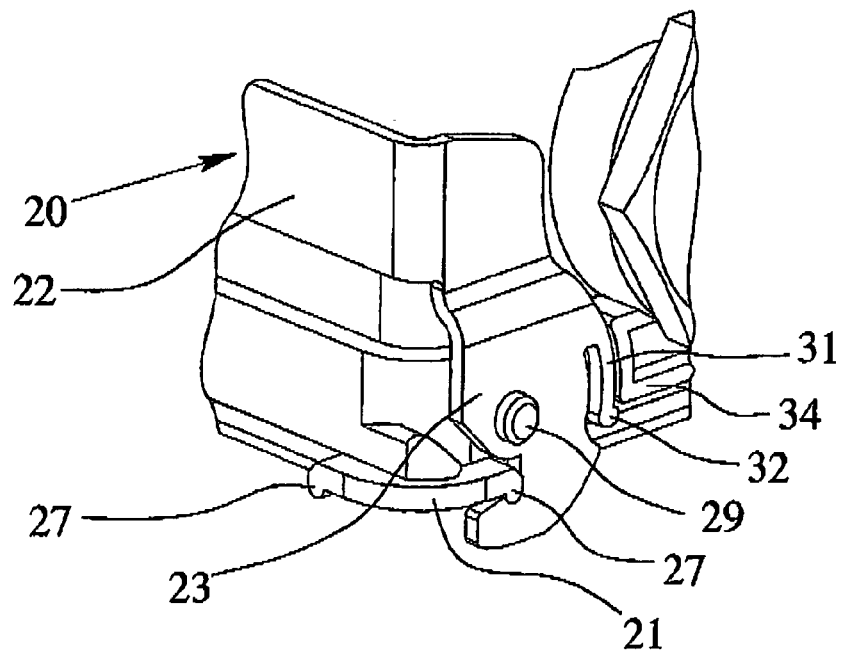

FIGS. 7a & 7b show that an elastic catch arm 31 is formed on the U-legs 23, 24 of the locking element 20. The catch arm 31 runs essentially radially relative to the axis of rotation of the locking element 20 and has a bead-like end 32 which in the first, open position of the locking element 20 adjoins the first edge 33 which is made on the housing 6 and is supported on this edge 33. In this way, the locking element 20 is kept in the first, open position so that the individual junction boxes 2 are easily placed on one another, and then, by intentionally pivoting the locking elements 20, they can be fixed to one another. Due to the elastic property of the catch arm 30 and its bead-like end 32 and the corresponding rounding on the edge 33, when the locking element 20 is pivoted out of its locking position, the catch arm 31 can be easily released so that the locking element 20 can be pivoted into the second position, i.e., the locking position.

FIG. 7b shows that the catch arm 31 is released in the second position, i.e., the locking position, of the locking element 20, the bead-shaped end 32 of the catch arm 31 now extending under the second edge 34 which is located opposite the first edge 33. In this way the catch arm 31 causes additional locking of the locking element 20 in the second position, i.e., the locking position.

To fix the base part 3 on the machine housing 5 or in a control cabinet (not shown), the base part 3 has a peripheral edge 25, in the four corners of the edge 35 one hole 36 each being formed through which the base part 3 and thus the entire housing arrangement 1 can be attached to the machine housing 5 by means of screws 37.

Figure 8:
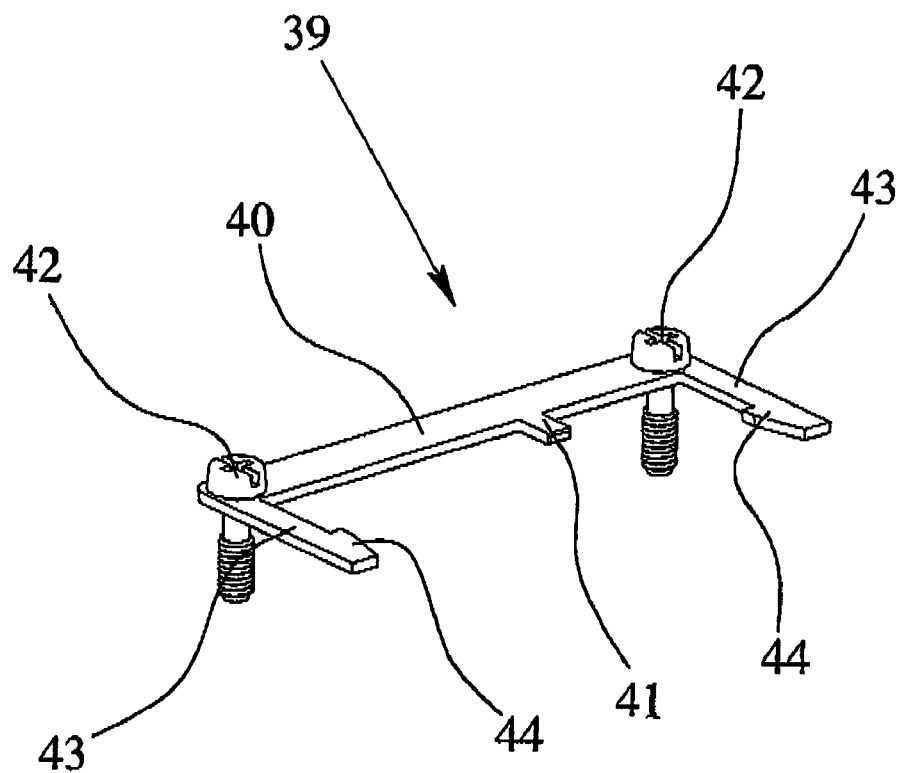
FIG. 8 shows a metal part which is used as grounding piece in a junction box.

As is apparent from FIG. 3, within the housing 6 in the corners there are domes 38 which each has a hole with an internal thread. The domes 38 are used to attach the metal part 39 which is shown in FIG. 8 and which is made essentially U-shaped, on the back 40 of the metal part 39 there being a connecting bar 41. The connecting bar 41 as shown in FIG. 3 can be inserted into the terminal 7 of the connector 14 so that the metal part 39 can act as the grounding metal for the junction box 2. To fix the metal part 39 in the housing 6 in the corners of the metal part 39 holes are formed through which screws 42 can be screwed into the internal thread of the domes 38. Hooks 44 which are formed on the U-legs 43 of the metal part 39 can, moreover, fix the connector 14 additionally in the housing 6.

What is claimed is:

1. Housing arrangement, comprising: at least two junction boxes, each of which has a square housing containing a terminal strip with at least one terminal for electrical connection of an electric cable or a line and having at least one opening for electric cables or lines, a base part, and a cover, wherein the individual junction boxes are mountable on top of one another in any of four positions which are turned by 0°, 90°, 180° and 270°, respectively, relative to one another, wherein the terminal strips are made as connectors with a plug part and a socket part, wherein the connectors are mountable in each junction box in any of four positions which are turned by 0°, 90°, 180° and 270°, respectively, relative to one another, and wherein the connectors of two junction boxes which are mounted on top of one another are connectable to one another such that the plug part of one connector is insertable into the socket part of another connector.

2. Housing arrangement according to claim 1, wherein bars are provided in an area of corners within the housing of the junction boxes and wherein corresponding guide grooves are provided on ends of the connectors such that the guide grooves of the connectors are slidable onto the bars.

3. Housing arrangement according to claim 1, wherein the terminals of the connectors are screw force terminals or spring force terminals.

4. Housing arrangement, comprising: at least two junction boxes, each of which has a square housing and the housings having at least one opening for electric cables or lines, and containing a terminal strip which has at least one terminal for electrical connection of an electric cable or a line, a base part, and a cover, wherein the individual junction boxes are mountable on top of one another, wherein there is at least one pivotable locking element on the housing of each junction box, each locking element being movable between a first, open position and a second, locking position, wherein projecting ribs are formed in an area of outside corners of the housing of each junction box, and wherein the locking element is essentially U-shaped, having a U-bridge formed as an actuating clip and two U-legs, ends of each U-leg having a recess, wherein the recesses of the U-legs of the locking element on one of the junction boxes, in the second, locking position thereof, extend around a respective one of the ribs in the corner areas of the housing of another of the junction boxes which is mounted to said one of the junction boxes.

5. Housing arrangement according to claim 4, wherein there is a respective locking element pivotably arranged each of two opposing sides of the housing of each junction box.

6. Housing arrangement according to claim 4, wherein the recesses in the ends of the U-legs of the locking elements have a depression and wherein the ends of the ribs have a thickened area so that the thickened area locks in the depression, in the second, locking position.

7. Housing arrangement according to claim 4, wherein a hole is formed in each of the U-legs of the locking element, wherein there is a respective pin on each of two opposing sides of the housing which forms an axis of rotation for the locking element, and wherein the locking element with the holes are lockable onto the pins.

8. Housing arrangement according to claim 4, wherein a grip section is formed by a bent portion of the U-bridge of the locking element.

9. Housing arrangement according to claim 4, wherein an elastic catch arm is formed on the U-legs of the locking element, the catch arm having a bead-like end which, in the first, open position, adjoins a first edge of the housing of the junction box so that the locking element is kept in the first, open position.

10. Housing arrangement according to claim 9, wherein the end of the elastic catch arm adjoins a second edge of the housing of the junction box in the second, locking position, so that the locking element is held in the second, locking position.

11. Housing arrangement according to claim 4, wherein outwardly projecting ribs are formed in the area of the corners of the base part, each of the ribs being engageable in a respective recess in the ends of the U-legs of the locking elements of the junction box.

12. Housing arrangement according to claim 4, wherein at least one opening for electric cables or lines is provided in the base part.

13. Housing arrangement according to claim 4, wherein holes are provided in the base part, so that the base part can be mounted in a control cabinet or on a machine housing by means of screws.

14. Junction box, comprising: a square housing, and at least one terminal strip which has at least one terminal for electrical connection of an electric cable or a line, the housing having at least one opening for electric cables or lines, especially for use in a housing arrangement having a plurality of like junction boxes, wherein the terminal strip is a connector with a plug part and a socket part, and wherein the connector is not fixed in the housing, but is selectively mountable in the housing in any of four positions which are turned by 0°, 90°, 180° and 270°, respectively, relative to one another.

15. Junction box according to claim 14, wherein bars are provided in an area of corners within the housing and wherein corresponding guide grooves are provided on ends of the connectors such that the guide grooves of the connectors are slidable onto the bars.

16. Junction box according to claim 14, wherein guide grooves are provided in an area of corners within the housing and wherein corresponding bars are provided on ends of the connectors such that the bars of the connectors are slidable into the guide grooves.

17. Junction box according to claim 14, wherein the terminals of the connector are screw force terminals or spring force terminals.

18. Junction box according to claim 14, wherein the housing has two openings for electric cables or lines, one in each of two opposite side walls.

19. Junction box according to claim 14, wherein domes are provided in the corners of the housing and wherein holes with internal threads are formed in the domes.

20. Junction box according to claim 14, wherein there is a U-shaped metal part having a back, wherein at least one connecting bar is formed at the back of the metal part, which can be connected to a terminal of the connector.

21. Junction box according to claim 20, wherein a hole is provided in each of the two corners of the metal part for screwing a screw into a dome in the housing.

22. Junction box according to claim 21, wherein there is a locking element on each of two opposing sides of the housing, each locking element being pivotably arranged on pins which are formed on the housing, such that the locking elements movable between a first, open position and a second, locking position, wherein the locking elements are each essentially U-shaped having a U-bridge which forms an actuating clip and two U-legs, a recess in each end of the U-legs, and wherein projecting ribs are formed in the area of the corners outside on the housing on the side opposite the locking elements.

23. Junction box according to claim 22, wherein a grip section is formed by a bent portion of the U-bridge of the locking element.

24. Junction box according to claim 22, wherein an elastic catch arm is formed on each of the U-legs of the locking element, the catch arm having a bead-like end, which in the first, open position adjoins the first edge which is made on the housing so that the locking element is kept in the first, open position.

25. Junction box according to claim 24, wherein the end of the elastic catch arm adjoins a second edge which is formed on the housing, in the second, locking position, so that the locking element is held in the second, locking position.

* * * * *